(No Model.)
T. CAREY.
SEWING MACHINE CLUTCH.
No. 244,032. Patented July 12, 1881.
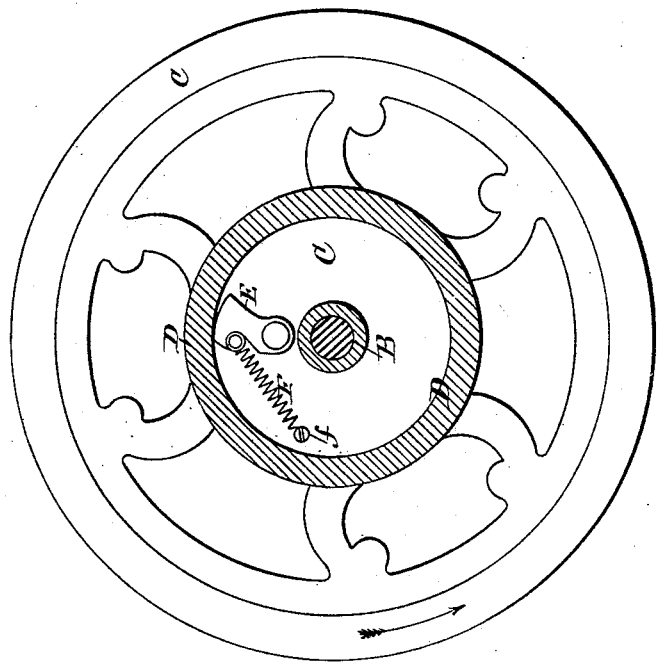
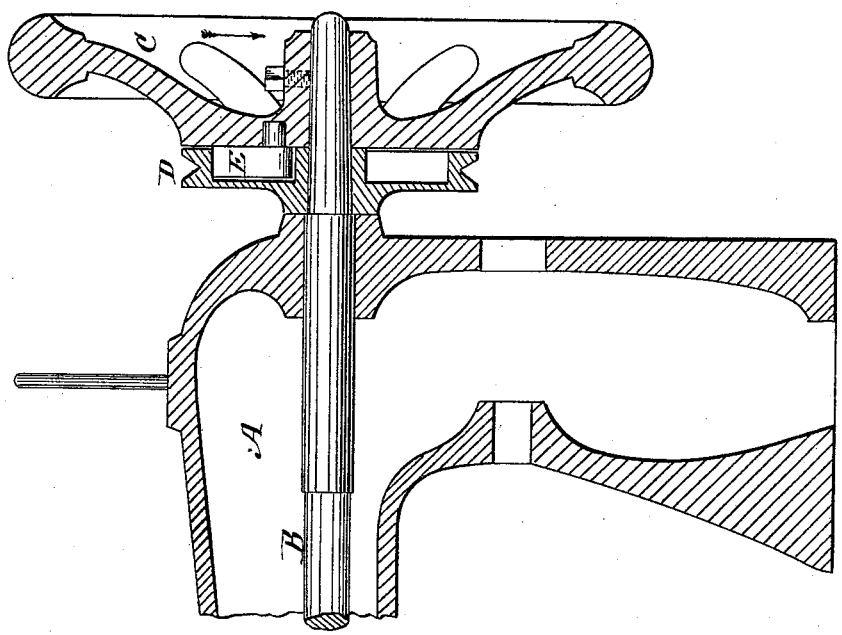
Witnesses:
E. E. Masson
C. J. Hedrick
Inventor:
Thomas Carey by
A. Pollok
his attorney

UNITED STATES PATENT OFFICE.

THOMAS CAREY, OF WATERTOWN, NEW YORK, ASSIGNOR TO THE DAVIS SEWING MACHINE COMPANY, OF SAME PLACE.

SEWING-MACHINE CLUTCH.

SPECIFICATION forming part of Letters Patent No. 244,032, dated July 12, 1881.

Application filed May 28, 1881. (No model.)

*To all whom it may concern:*

Be it known that I, THOMAS CAREY, of Watertown, in the county of Jefferson and State of New York, have invented a new and useful Improvement in Sewing-Machine Clutches, which improvement is fully set forth in the following specification.

This invention has reference to sewing-machine clutches or devices for imparting motion to the main or driven shaft of the machine.

Ordinarily the motion is imparted to the main shaft of a sewing-machine by means of a belt running upon a pulley permanently secured to said shaft.

In order to give facility for winding the bobbin the pulley has been mounted loose upon the shaft, and combined with a clutch which engages with the shaft when the pulley is turned in one direction, but automatically releases it when turned in the opposite direction. This arrangement, besides giving facility for winding bobbins, also prevents running of the machine backward. It is embodied in the invention, which has for its object to improve the construction and operation of the devices; and it consists in the combination, with a solid hand or fly wheel fixed thereon, and a separate and distinct self-acting clutch, and specially a self-acting friction-clutch, for effecting the engagement and disengagement of the said shaft and pulley, and also in the particular combination and arrangement of the shaft, fly-wheel, pulley, and clutch, as hereinafter set forth.

The following description will enable those skilled in the art to make and use the said invention, reference being had to the accompanying drawings, which form a part of this specification, and in which—

Figure 1 is a view, in sectional elevation, of a portion of a sewing-machine in a plane lengthwise of the goose-neck; and Fig. 2, a similar view in a plane at right angles to that of Fig. 1.

A is the goose-neck of the machine; B, the main or driven shaft, turning in bearings in the goose-neck; and C, the solid hand or fly wheel, which is fixed by a set-screw, or in any suitable way, on said shaft. The term "solid" is applied to the hand-wheel in contradistinction to a wheel divided into two parts, one carrying the pulley and the other fixed to the shaft, which has been heretofore combined with a self-acting clutch.

The pulley D is placed loose on the main shaft, between the fly-wheel and the goose-neck. On the inner face of the fly-wheel C is pivoted a dog, E, which extends into the interior of the pulley D, and with which is combined a spring, F, fastened at one end to a screw or projection, *f*, on the fly-wheel, and at the other to the dog E, and tending to hold the dog in contact with the inner periphery of the pulley. The spring and dog thus arranged constitute a self-acting friction-clutch, which will allow the pulley D to turn freely to the right (Fig. 2) independent of the fly-wheel, but which, as soon as the pulley is turned in the opposite direction, (indicated by the arrows,) connects the driving-pulley with the fly-wheel, so that said wheel and the main shaft of the machine are revolved with it. The fly-wheel is made without opening out to the periphery of the pulley D, so as to prevent entrance into the pulley of dust or other foreign substances likely to interfere with the proper action of the clutch.

Modifications may be made in the details of the machine without departing from the spirit of the invention.

Having now fully described the said invention and the manner of carrying the same into effect, what I claim is—

1. The combination, with the shaft of a sewing-machine, a solid hand or fly wheel fixed thereto, and a separate and distinct pulley mounted loosely on said shaft, of a self-acting clutch for connecting said pulley and fly-wheel when the former is revolved in one direction, and for allowing it to turn freely when revolved in the other, substantially as described.

2. The combination of a shaft, a solid hand or fly wheel fixed thereto, a separate and distinct pulley mounted loosely on the shaft, and a self-acting friction-clutch, substantially as described.

In testimony whereof I have signed this specification in the presence of two subscribing witnesses.

THOMAS CAREY.

Witnesses:
LEVI A. JOHNSON,
JAMES C. BURT.